United States Patent [19]

Fredd

[11] Patent Number: 4,537,383

[45] Date of Patent: Aug. 27, 1985

[54] VALVE

[75] Inventor: John V. Fredd, Dallas, Tex.

[73] Assignee: Otis Engineering Corporation, Dallas, Tex.

[21] Appl. No.: 657,009

[22] Filed: Oct. 2, 1984

[51] Int. Cl.³ .............................................. F16K 31/12
[52] U.S. Cl. ........................................ 251/58; 251/95;
   251/251; 251/352; 166/323; 166/330; 74/57
[58] Field of Search ................................ 166/319–321,
   166/323, 325, 327, 330, 332; 251/58, 218, 94,
   95, 251, 283, 352; 74/57, 104, 107

[56] References Cited

U.S. PATENT DOCUMENTS

| 3,007,669 | 11/1961 | Fredd | 251/31 |
| 3,398,762 | 8/1968 | Fredd | 137/495 |
| 3,398,928 | 8/1968 | Fredd | 251/251 |
| 3,494,417 | 2/1970 | Fredd | 166/73 |
| 3,783,942 | 1/1974 | Mott | 166/323 |
| 4,210,207 | 7/1980 | McStravick et al. | 166/330 |
| 4,230,185 | 10/1980 | Fredd | 166/332 |
| 4,262,693 | 4/1981 | Giebeler | 251/58 |
| 4,289,165 | 9/1981 | Fredd | 137/625.32 |
| 4,320,804 | 3/1982 | Brooks | 166/339 |
| 4,436,157 | 3/1984 | Brooks | 166/344 |

Primary Examiner—Samuel Scott
Assistant Examiner—Noah Kamen
Attorney, Agent, or Firm—Vinson & Elkins

[57] ABSTRACT

A ball valve with cooperative cranks for rotating the ball valve in which the cranks run in arcuate waffle plates having intersecting lands and grooves and wherein the ball valve is spherical and retainer rings cooperate with the ball valve to hold the cranks in engagement with the waffle plate even when pumping through the valve and moving the ball valve away from an upper seat while retaining the ball valve actuator in the closed position.

7 Claims, 9 Drawing Figures

VALVE

BACKGROUND OF THE INVENTION

This invention relates to ball valves.

A ball valve has been designed in the past utilizing a waffle plate having intersecting lands and grooves which cooperated with followers for rotating a ball valve. The waffle plate face containing the lands and grooves extended in a single plane, thus limiting the mechanical strength possible with the design as the cranks in moving in the grooves of the waffle plate could traverse only a limited lateral distance across the waffle plate. See the application of Gano and Kohn, Ser. No. 06/552,446 filed Nov. 16, 1983.

OBJECTS OF THE INVENTION

It is an object of this invention to provide a ball valve utilizing a waffle plate in which the lateral distance which can be traversed by the crank arms in moving the ball valve member between open and closed positions is increased by moving the cranks through an arc instead of along a straight line.

Design and manufacturing parameters limit the arcuate dimension of curved waffle plates.

It is, therefore, another object of this invention to provide a relationship between arcuate waffle plates and cranks which cooperate with the waffle plates in which a portion of the cranks may extend in a circumferential direction past the side edge of the waffle plates to provide for additional travel of the cranks in moving between the full open and closed positions of the ball valve.

Ball valves are desirable designed so that pressure from above the ball valve may be exerted to open the ball valve and permit pumping down in a well.

To allow pumpdown with a waffle plate design including a spherical ball valve member presents problems in maintaining the cranks with the crank lands and grooves in engagement with the waffle plate lands and grooves. It is an object of this invention to provide a ball valve in which the valve may be moved away from its seat and rotated to pump by the valve without reciprocating the valve actuator and in which during such motion the ball valve cranks are held in engagement with the waffle plates.

It is a further object to provide a ball valve as in the preceding objects in which the design includes both an upper and lower valve seat.

Other objects, features and advantages of the invention will be apparent from the drawings, the specification and the claims.

BRIEF DESCRIPTION OF THE DRAWINGS

In the drawings wherein an illustrative embodiment of this invention is shown, and wherein like reference numerals indicate like parts.

DESCRIPTION OF THE PREFERRED EMBODIMENT

Figure 1:
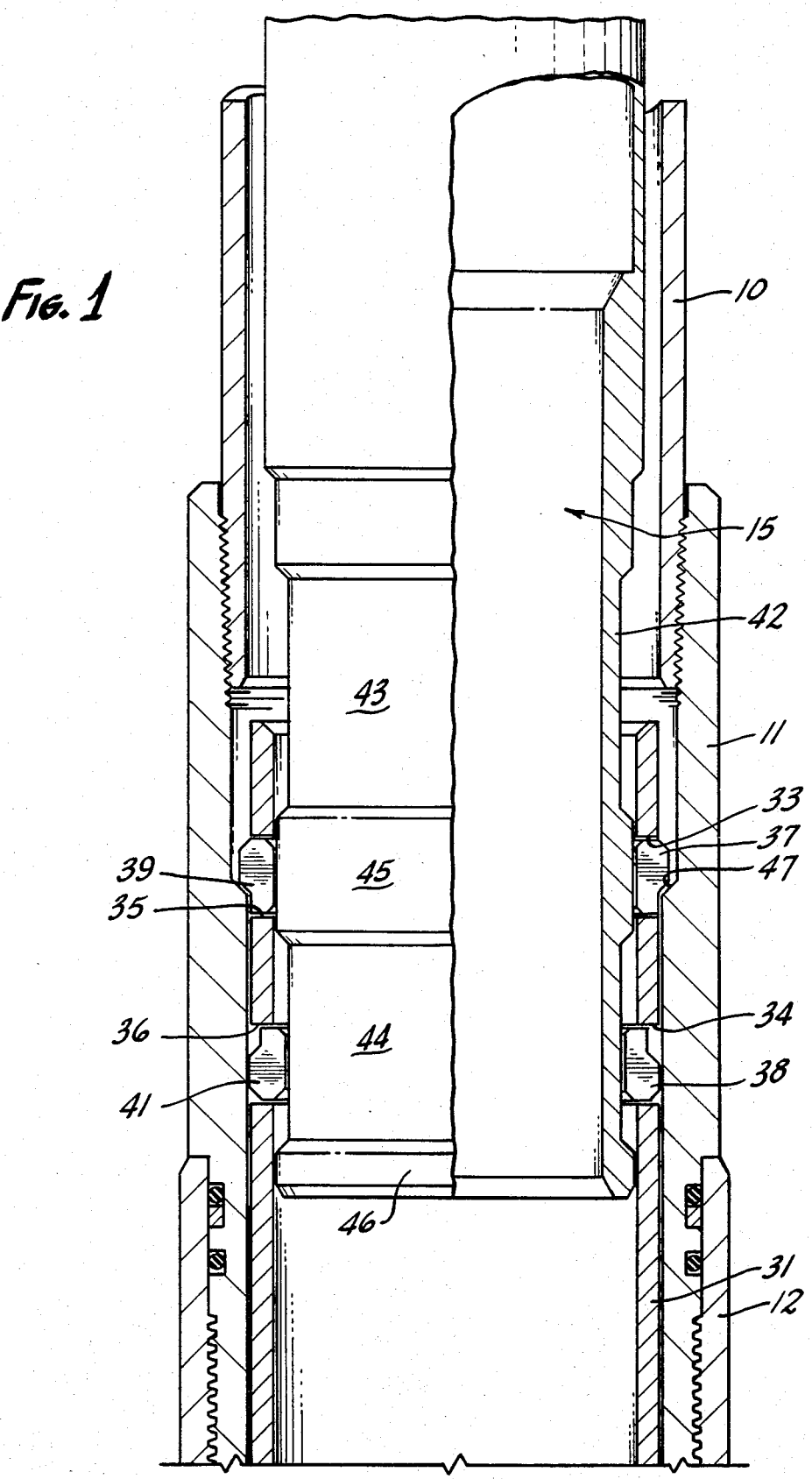
FIG. 1 is a view partly in section and partly in elevation of the upper end of the valve.

A housing for the valve depends from the upper tube 10. The housing includes the upper sub 11, a ball housing 12, and a lower sub 13 to which a lower tubing 14 may be connected, as shown.

The housing has a flowway, indicated generally at 15, extending therethrough.

Flow through the valve is controlled by the ball valve member, indicated generally at 16. The ball valve member 16 is a true sphere except where interrupted by the flowway 17 extending therethrough. A pair of holes 18 and 19 extend through one spherical side of the ball. A similar pair of holes 21 and 22 are provided in the ball on the other side. A groove 23 may be provided in the seal surface of the ball to equalize pressure about the groove as the ball moves across the edge of a seat.

Seat means is provided to cooperate with the ball 16 and may be provided by a single or double seat.

The ball 16 cooperates with a lower seat 24 having a seat surface 24a on its upper end. The lower seat 24 extends into the lower sub 13 and sliding seals 25 and 26 seal between the seat 24 and the lower sub 13. If desired, the seat seal surface 24a may be hard surfaced to reduce wear. The seat 24 has a bore 27 therethrough which provides a part of the flowway through the valve. The valve seat further has an external flange 28 against which force may be applied to urge the seat against the valve member.

An upper seat may be provided by a seat surface 29 carried on the lower end of an actuator means which includes the actuator 31. The actuator is provided with a reduced diameter section 32 and a groove 31a in the reduced diameter section for receiving a split lock ring.

In the illustrated embodiment the upper seat is not depended upon as a seal to prevent flow through the valve. The upper seat functions to bear against and rotate the ball 16.

If desired, sliding seals may be provided between the actuator 31 and the upper sub so that any leakage past the lower seat 24 will be contained by the upper seat 29. In such case the upper seat would be relied upon to act as a seal. In the design illustrated the upper seat seals with the ball, but in the absence of seals between the actuator and housing the upper seat will not prevent flow through the flowway.

At its upper end, the actuator 31 has holes 33, 34, 35 and 36 for receiving locking dogs 37, 38, 39 and 41.

The actuator means may further include the shifting and lock-out tube 42. This tube has reduced diameter sections 43 and 44 with a flange 45 therebetween, as well as a lower flange 46. These two reduced diameter sections 43 and 44 and the flanges 45 and 46 cooperate with the locking dogs to lock the actuator 31 against downward movement by coaction of the lugs 37 and 39 with the shoulder 47. The lower lugs 38 and 41 are expanded by the flange 45 when the actuator is in the lower position and engage the lower end 48 of the upper sub 11 to latch the actuator tube 31 against upward movement. Thus, by reciprocation of the shifting tube 42, the two flanges will cooperate with the lugs to reciprocate the actuator member 31 within the housing and will latch it in each of its two extreme positions.

Ball rotation means is provided for rotating the ball valve member 16 between open and closed positions. This rotation means is operable in response to reciprocation of the actuator 31 and to the relative reciprocation of waffle plates and cooperative cranks in the housing.

Preferably, two waffle plates 51 and 52 are provided on opposite sides of the ball 16. Preferably, the waffle plates are held against vertical reciprocation relative to the housing by providing an inturned flange 53 which is received within groove 54 in the lower extremity of the upper sub 11. Each waffle plate is formed as a segment of a ring with an outer arcuate surface 55 bearing against the inner bore 56 of the ball housing 12. Below the flange 53 the inner arcuate surface of each waffle plate has symmetrical intersecting helical grooves 57 and 58 resulting in intersecting lands 61 and 62. As shown in the development view of FIG. 8, these lands and grooves preferably intersect at approximately equal angles inclined a few degrees from the vertical.

Figure 5:
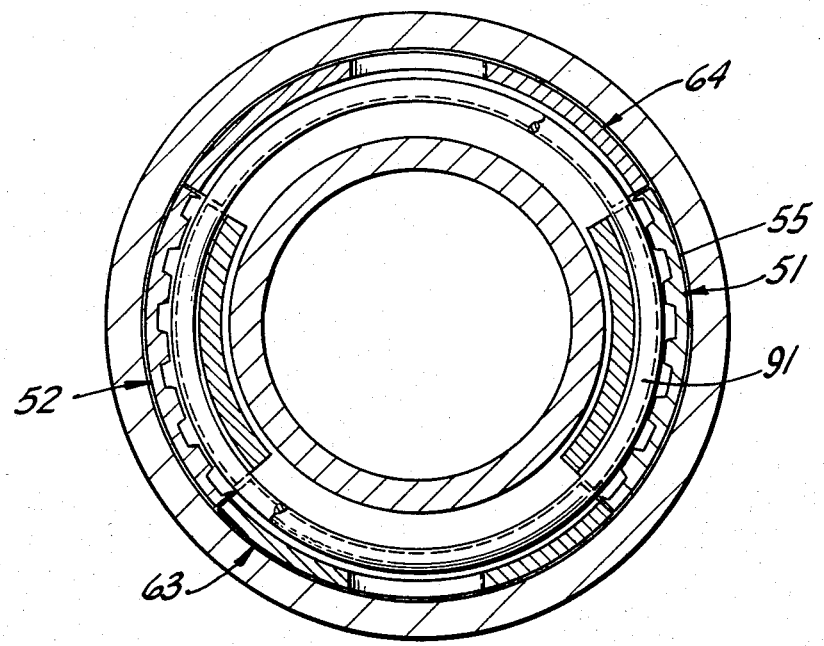
FIG. 5 is a sectional view along the lines 5—5 of FIGS. 2A and 2B and showing the relationship of the parts at this level.
Figures 6, 7:
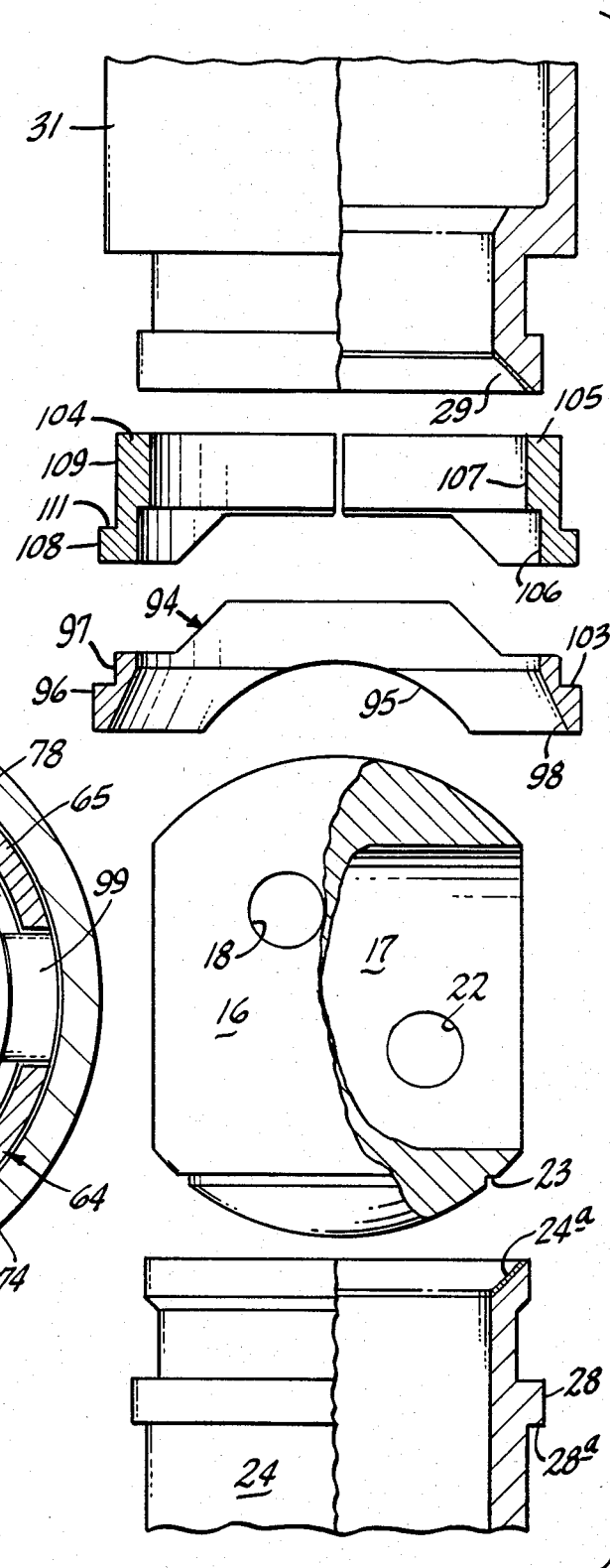
FIG. 6 is a sectional view taken along the lines 6—6 of FIGS. 2A and 2B with fragments of some parts shown in elevation.
FIG. 7 is an exploded view of the ball valve member, its associated lower seat, upper seat, upper retainer ring, and split lock ring.

The two waffle plates are held in spaced relationship by a pair of yokes, indicated generally at 63 and 64. These yokes are formed as segments of a ring and alternate with the waffle plates to space the waffle plates apart as best shown in FIGS. 5 and 6.

Referring first to the yoke 64, the outer diameter 65 of the yoke is arcuate along its entire length to provide a cylindrical surface for engagement with the bore 56 of the ball housing. The inner diameter of the yoke 64 varies to provide shoulders and surfaces for cooperation with other parts. At the upper end of the yoke the inner diameter 66 is relatively large to permit the yoke to slide past the lower end 48 of the upper sub 11. The yoke then has a relatively small diameter portion 67 to provide an internal flange. Below the internal flange the yoke diameter portion 68 is increased in diameter down to the shoulder 69. Below the shoulder 69 the internal diameter is again increased at 71 to receive a spring. The bottom of the yoke terminates in an internal flange portion 72. The central portion of the yoke it is provided with a vertical slot 73. In the side edges of yoke 64 abutting the two waffle plates, the yoke is provided with a recess 74 extending between shoulders 76 and 77. The yoke 63 has the same general configuration and has the same above described parts 66 through 72 which have been given the corresponding numbers 66a through 72a in the development of FIG. 8. The recesses 78 in yoke 63 comparable to recesses 74 extends for a greater length to shoulder 70. The cooperation of the various surfaces and shoulders of the yokes with other structures will be stated below.

Figure 8:
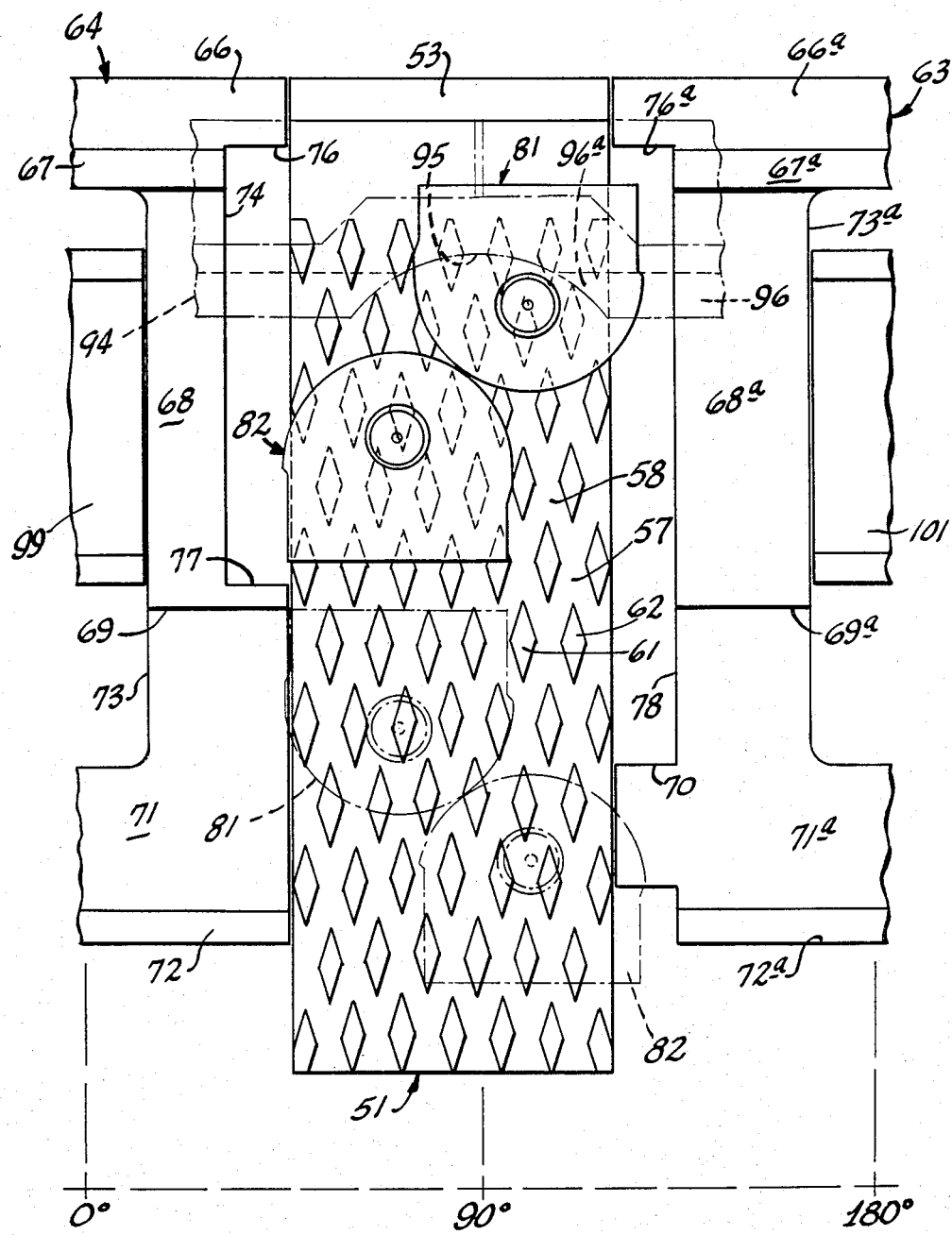
FIG. 8 is a development view from the interior of the valve of one waffle plate held between fragments of the yokes on either side thereof and illustrating one pair of cranks and fragments of two latches and illustrating in phantom a fragment of the upper retainer ring and the upper split latch ring and also showing in phantom the lower position of the pair of cranks when the waffle plate and the remaining structure shown in FIG. 8 have moved relative to each other to position the cranks adjacent the lower end of the waffle plate.

Four cranks 81, 82, 83 and 84 are rotatably coupled in pairs to opposite spherical sides of the ball valve member. The cranks of each pair have helical lands and grooves inclined in opposite directions and mating with the lands and grooves of one waffle plate. Each crank has a semispherical protrusion or pin, such as the protrusion 81a (FIG. 2B) carried by crank 81, which engages in a hole in the ball valve 16. In the case of the crank 81 the protrusion 81a engages in the hole 18. In like manner, the other cranks have protrusions which extend into and engage the remaining holes in the ball valve 16. As best seen in FIGS. 5, 6 and 8, the cranks, other than their protrusions, are formed generally as segments of a ring and the outwardly facing portion of the crank is provided with lands and grooves which mate with the lands and grooves of the waffle plates. Thus, the crank 81 (FIG. 6) is provided with lands 85 and grooves 86 which cooperate with the lands and grooves of the waffle plate 51 so that relative motion between the crank and waffle plate in a longitudinal direction; that is, along the axis of the flowway through the valve result in lateral movement of the cranks and rotation of the ball 16. Each of the four cranks is constructed as described above, except that the lands and grooves of each pair, such as pairs 81 and 82, extend at different angles to engage the crossing lands and grooves of the waffle plate.

In conventional ball valves, the ball valve member has flat sides with holes extending through the flat sides into which the crank pins extend. These flat sides maintain the cranks in the appropriate relationship. As the waffle plates are segments of a ring, the ball is desirably spherical and provision should be made to insure that the cranks remain in contact with the waffle plates.

Figures 2A, 2B, 3:
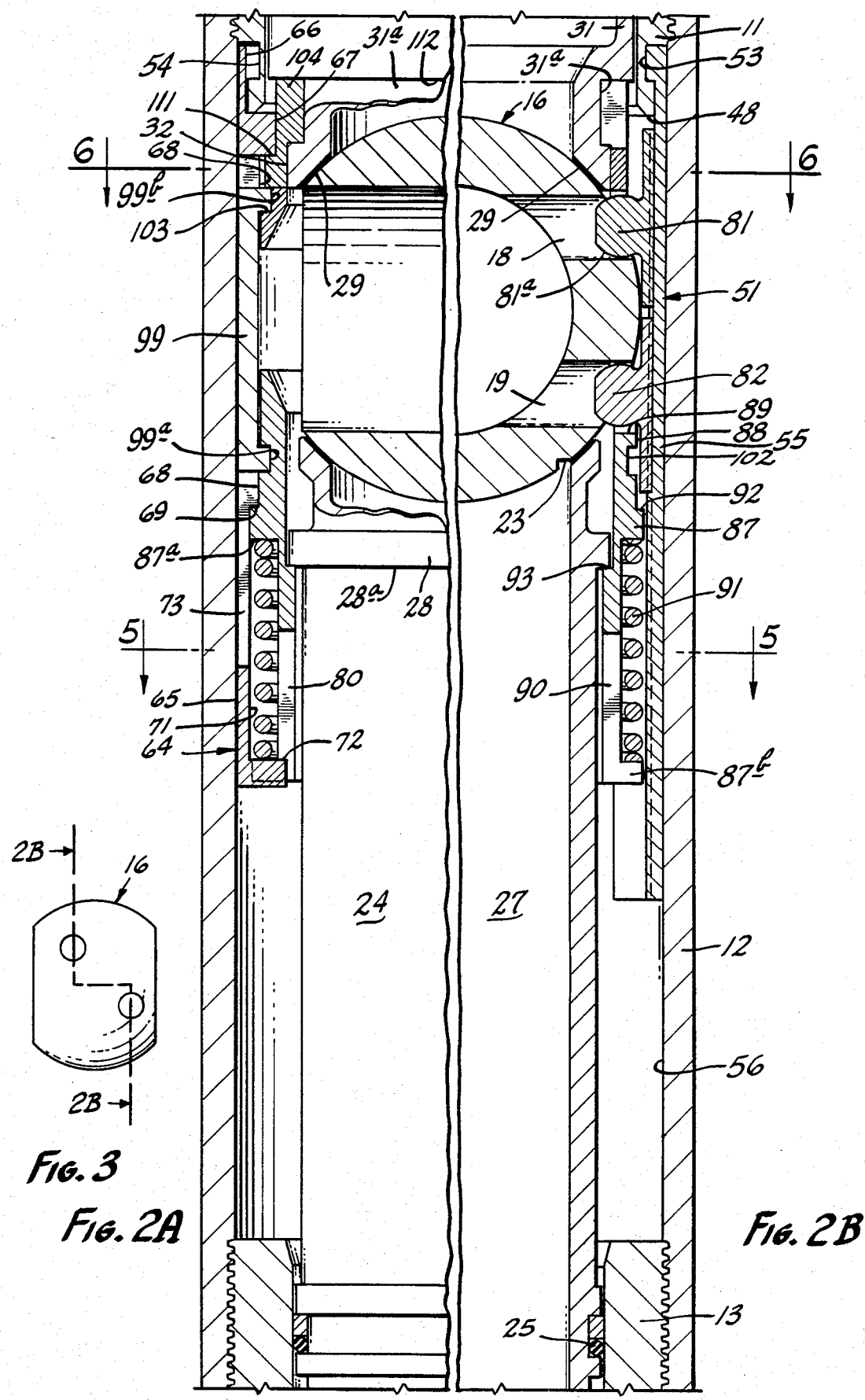
FIG. 2A is a view partly in quarter section and partly in elevation through the yoke section of the ball valve and is a continuation of FIG. 1.
FIG. 2B is a quarter section view similar to FIG. 2A and ninety degrees and taken at the same elevation as FIG. 2A and along the lines 2B—2B of FIG. 3 and is a continuation of FIG. 1.
FIG. 3 is a diagrammatic illustration of the ball valve with the section line 2B—2B showing the line along which section 2B was taken.
Figure 4:
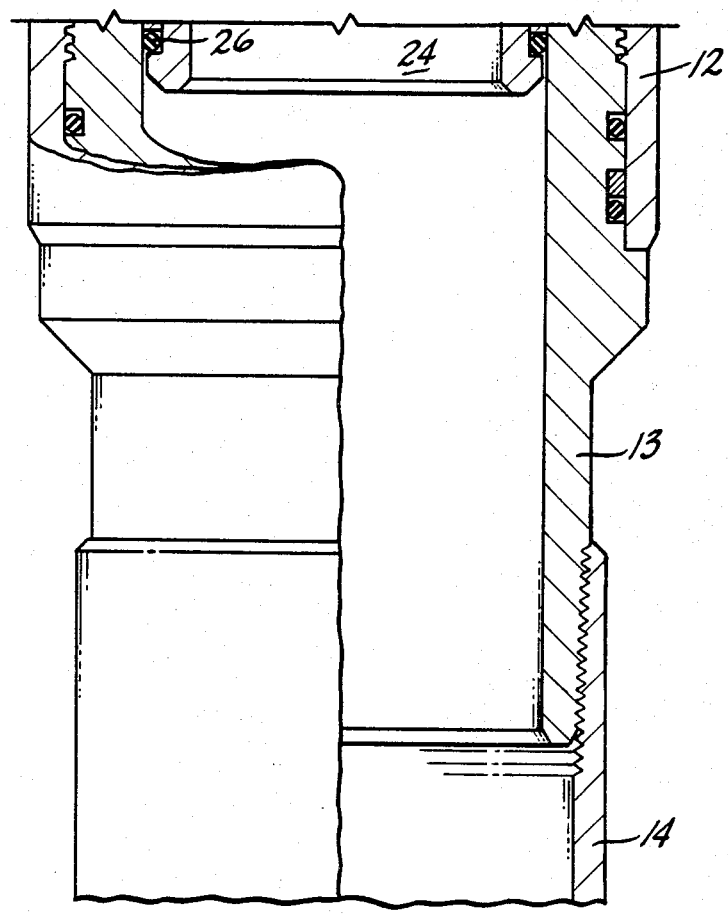
FIG. 4 is a view partly in elevation and partly in cross-section and is a continuation of FIGS. 2A and 2B.

For this purpose, a lower retainer ring 87 is provided. This ring has an outer annular upper surface 88 which engages the lower cranks and cooperates with the spherical surface of the ball to hold the cranks with their lands and grooves in engagement with the lands and grooves of the waffle plates. The lower retainer is cut away at 89 on each side to permit the pins of the cranks to extend into the hole in the ball, as shown in FIG. 2B.

This lower retainer ring 87 has a downwardly facing shoulder 87a and an inturned flange 87b and a resilient means, such as spring 91, extends between the shoulder 87 and flange 87b. The spring also bears against inturned flanges 72 and 72a on the two yokes so that the spring 91 urges the lower retainer upwardly relative to the two yokes. The lower retainer ring is provided with an upwardly facing external shoulder 92 which engages the downwardly facing shoulder 69 on the yoke (FIG. 2A) to limit upward movement of the retainer ring relative to the yokes. The retainer ring has vertical slots 80 and 90 in its lower end to receive the yoke flanges 72 and 72a and permit relative reciprocation of the retainer ring and yokes.

The lower retainer ring 87 also has an upwardly facing shoulder 93 which engages the downwardly facing shoulder 28a provided by flange 28 on the lower seat. Thus, the spring 91 acting through the lower retainer ring 87 maintains the lower seat 24 with its seat surface 24a in engagement with the ball valve member 16.

Above the ball valve member 16 there is provided a retainer ring 94 for cooperation with the ball valve member 16 in maintaining the upper cranks with their lands and grooves in contact with the lands and grooves of the waffle plates. The upper retainer ring, indicated generally at 94, has a lower circular cutout 95 to provide clearance for the upper cranks, as best seen in FIG. 8. The lower retainer ring has a major diameter portion 96 and a minor diameter portion 97 on its outer annular surface. The major diameter portion 96 of the retainer ring bears against the cranks 81 and 83 and urges them into engagement with the waffle plates 51 and 52. As shown in FIG. 8, with the valve in the fully closed position, the portion 96a of the major diameter section 96 bears against the crank 81 and in cooperation with the ball valve 16 which also bears against the lower end of the crank, as shown in FIG. 2B, maintains the crank in engagement with the waffle plate. As the crank arm translates to the left of FIG. 8, it immediately engages the continuation of the major diameter section 96 on the other side of the cutout 95 and the crank is supported on both sides for an intermediate portion of its movement and is then supported by the major diameter portion 96 on the left side of the crank arm, as viewed in FIG. 8, as it continues its translation to the dotted line view. The lower inner diameter portion of the retainer ring 94 is formed as a frusto-conical surface 98 for receiving the ball valve member 16.

Reciprocal within the two slots 73 and 73a in the yokes 64 and 63 are a pair of latches 99 and 101. These two latches have inturned flanges, such as 99a and 99b shown in FIG. 2A. The lower inturned flange cooperates with the external groove 102 in the lower retainer ring 87. The upper inturned flange 99b engages the shoulder 103 provided by the major and minor diameter sections of the retainer ring 94. Thus, as the latch 99 bears against the bore through the ball valve housing and is held in the position shown in FIG. 2A thereby, the upper and lower rings are latched in position on opposite sides of the ball valve member 16 and will move with the ball valve member.

Immediately above the retainer ring is a split lock ring formed in two halves 104 and 105. This lock ring has a major internal diameter 106 and a minor internal diameter 107. This minor internal diameter section 107 is received within the groove 31a in the lower end of the actuator 31. The major diameter section engages the flange 32 on the lower end of the actuator 31. The external surface of the split ring also is provided with a major diameter portion 108 and a minor diameter portion 109 with shoulder 111 therebetween. The minor diameter portion 109 receives the internal flanges 67 and 67a of the yokes to lock the actuator 31 to the two yokes by maintaining the flange 67 between the upwardly facing shoulder 111 on the split lock ring and the downwardly facing shoulder 112 of the actuator 31.

In operation with the valve in the closed position shown in FIGS. 2A and 2B, downward movement of the actuator tube 42 moves the land 45 from under the lugs 37 and 39 and releases the actuator 31. Continued downward movement brings the flange 45 into engagement with the lugs 38 and 41. Further downward movement of the actuator tube 42 drives the actuator 31 downwardly. This action continues until the lugs 38 and 41 pass the surface 48 at the lower end of the upper sub 11 at which point the lower lugs are driven outwardly and the flange 45 props these lugs outwardly to lock the valve in the open position.

As the valve actuator 31 moves downwardly, it bears against the ball valve member 16 and starts the movement of the ball valve member downwardly. As the waffle plates 51 and 52 are locked against downward movement, the downward movement of the ball is transferred to the cranks which are forced to move downwardly and laterally along the waffle plates to rotate the valve member from its closed to its open position. In the beginning of the downward movement of the actuator 31, the shoulder 112 on the actuator engages the flanges 67 and 67a on the two yokes and the entire yoke and other parts assembled about the ball valve member 16 move downwardly as a unit until the ball valve member reaches full open position. It will be appreciated that during such movement the upper crank 81 will move into a position projecting into the recess 74 of the yoke 64. The lower crank 82 will move into the recess 78 of yoke 63. Of course, the cranks on the other side will move into the like recesses. Depending upon the geometry of the design, the cranks may extend more or less into the two recesses. By permitting the cranks to extend into recesses in the yokes greater lateral movement of the cranks with a given size waffle plate is permitted resulting in greater mechanical advantage.

Opening movement of the valve is a reverse of that just discussed. Upward movement of the actuator tube 42 removes the land 45 from behind the lower lugs 38 and 41. The flange 45 engages the upper lugs 37 and 39 and drives the actuator 31 upwardly until the upper lugs pass the shoulder 47 where they are propped-out by the flange 45. It will be noted that some over travel is provided to insure that the desired operation is carried out. As the actuator 31 moves upwardly, it carries the ball valve 16, the two yokes, the four crank arms and all of the associated assembly upwardly to return the ball valve member to the closed position shown in the drawings.

It is sometimes desirable to pump through the valve with the actuator locked in the valve closed position. To do so requires that the valve be unseated and rotated at least to its partially open position. As the valve member 16 in carrying out such operation will leave its upper seat 29, the movement of the valve should carry with it sufficient of the above described structure to cooperate with the ball valve member and maintain the cranks in engagement with the waffle plates.

As pressure is applied downwardly and the ball begins to move downwardly, the ball urges the lower seat 24 downwardly against the force exerted by the spring 91. As the lower seat 24 moves down it carries with it the lower retainer ring 87 and due to the two latches 99 and 101 the upper retainer ring 94 also moves downwardly with the ball. The yokes and the split lock ring 104–105 remain in the position shown in FIGS. 2A and 2B. The latches move downwardly in the vertical slots 73 and 73a and carry with them the upper retainer ring 94 which continues to maintain the upper cranks with their lands and grooves in engagement with the lands and grooves of the waffle plates. During this downward movement the spring 91 is compressed as the lower valve seat 24 and the lower retainer ring are moved downwardly by pressure acting on the ball valve member 16. After pumping through the valve to the desired extent, pressure may be relieved above the valve and the spring 91 will return the ball valve member 16 to its closed position shown in FIGS. 2A and 2B.

The foregoing disclosure and description of the invention is illustrative and explanatory thereof and various changes in the size, shape and materials, as well as in the details of the illustrated construction, may be made within the scope of the appended claims without departing from the spirit of the invention.

What is claimed is:

1. A valve comprising:
a housing having a flowway therethrough;
a spherical ball valve member and cooperable seat means;
ball rotation means for rotating said ball valve member between open and closed position including:
a pair of spaced waffle plates formed as segments of a ring with their non-arcuate dimension parallel to said flowway,
said waffle plates having symmetrical, helical intersecting lands and grooves in their interior surfaces,
four cranks rotatably coupled in pairs to opposite spherical sides of the ball valve member,
the cranks of each pair having helical lands and grooves inclined in opposite directions and mating with the lands and grooves of one waffle plate; and
actuator means for reciprocating one of said waffle plates and crank pairs in directions parallel to said flowway to rotate the ball valve member between open and closed positions.

2. The valve of claim 1 wherein:
annular upper and lower retainer rings are positioned on opposite sides of the ball valve member and cooperate with the ball valve member to hold the lands and grooves of the cranks in engagement with the lands and grooves of the waffle plates, and
latch means holding the annular retainer means in spaced relationship on opposite sides of the ball valve member.

3. The valve of claim 2 wherein:
said seat means includes an upper seat carried by said actuator means,
said waffle plates are held against longitudinal movement in said housing,
yokes are carried by said actuator means between said waffle plates,
resilient means extends between said yokes and said lower retainer ring and urges said lower retainer ring upward,
said upper and lower retainer rings and latch means together with said ball valve member movable downwardly relative to said upper valve seat and actuator against said resilient means in response to an increase in pressure above said ball valve member to rotate said ball valve member and permit fluid to be pumped past said ball valve member.

4. The valve of claim 3 wherein:
said yokes have recesses in their surfaces abutting said waffle plates to permit said cranks to extend beyond the side edges of said waffle plates in the full open and closed positions of said valve member.

5. The valve of claim 3 wherein:
said yokes have vertical slots therein, and
said latch means is positioned in said slots in said yokes and reciprocal vertically relative thereto.

6. The valve of claim 4 wherein: said yokes have vertical slots therein, and said latch means is positioned in said slots in said yokes and reciprocal vertically relative thereto.

7. The valve as in claims 2, 3, 4, 5 or 6 wherein:
a lower valve seat is carried by said lower retainer ring, and
sliding seal means is provided between said lower valve seat and said housing.

* * * * *